United States Patent [19]
Mennemeier et al.

[11] Patent Number: 5,862,067
[45] Date of Patent: Jan. 19, 1999

[54] METHOD AND APPARATUS FOR PROVIDING HIGH NUMERICAL ACCURACY WITH PACKED MULTIPLY-ADD OR MULTIPLY-SUBTRACT OPERATIONS

[75] Inventors: Larry M. Mennemeier, Boulder Creek; David I-Keong Wong, Torrance, both of Calif.

[73] Assignee: Intel Corporation, Santa Clara, Calif.

[21] Appl. No.: 581,067

[22] Filed: Dec. 29, 1995

[51] Int. Cl.[6] .................................................. G06F 7/38
[52] U.S. Cl. .............................. 364/748.07; 364/736.02; 364/748.14; 395/562; 395/800.42
[58] Field of Search .................................. 364/736, 754, 364/750.5, 758, 760, 715.011, 736.02, 748.07, 748.09, 748.14, 748.16, 751, 754.01, 759; 395/650, 675, 750, 800, 562, 800.32, 800.36, 800.42

[56] References Cited

U.S. PATENT DOCUMENTS

| | | | |
|---|---|---|---|
| 3,711,692 | 1/1973 | Batcher | 364/715.09 |
| 3,723,715 | 3/1973 | Chen et al. | 364/786.04 |
| 4,161,784 | 7/1979 | Cushing et al. | 364/748.19 |
| 4,344,151 | 8/1982 | White | 364/754 |
| 4,393,468 | 7/1983 | New | 364/749 |
| 4,418,383 | 11/1983 | Doyle et al. | 395/307 |
| 4,498,177 | 2/1985 | Larson | 371/52 |
| 4,707,800 | 11/1987 | Montrone et al. | 364/788 |
| 4,771,379 | 9/1988 | Ando et al. | 395/800.42 |
| 4,989,168 | 1/1991 | Kuroda et al. | 364/715.09 |
| 5,095,457 | 3/1992 | Jeong | 364/758 |
| 5,111,422 | 5/1992 | Ullrich | 364/750.5 |
| 5,187,679 | 2/1993 | Vassiliadis | 364/786.01 |
| 5,262,976 | 11/1993 | Young et al. | 364/760 |
| 5,442,799 | 8/1995 | Murakami et al. | 395/800 |
| 5,457,805 | 10/1995 | Nakamura | 364/750.5 |

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Inc. (1991).

*Errata to MC88110 Second Generation RISC Microprocessor User's Manual*, Motorola Inc. (1992), pp. 1–11.

*MC88110 Programmer's Reference Guide*, Motorola Inc. (1992), pp. 1–4.

*i860™ Microprocessor Family Programmer's Reference Manual*, Intel Corporation (1992), Ch. 1, 3, 8, 12.

R.B. Lee, *Accelerating Multimedia With Enhanced Microprocessors*, IEEE Micro (Apr. 1995), pp. 22–32.

*TMS320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video*, Microprocessor Report (Jan. 1994), pp. 16, 17.

(List continued on next page.)

*Primary Examiner*—Emmanuel L. Moise
*Attorney, Agent, or Firm*—Blakely, Sokoloff, Taylor & Zafman LLP

[57] ABSTRACT

A method and apparatus for combining at least two packed multiply-accumulate instructions (or equivalent operations) to compute a filter result from coefficients having more bits than can be processed by a single multiply-accumulate instruction (or equivalent operation). This achieves greater accuracy in computing transforms and digital filters without requiring more expensive hardware to implement multiply-accumulate instructions for larger operands. Typical applications are compression/decompression algorithms, modem, audio and video. The invention is scalable, permitting additional multiply-accumulate instructions to be added as incrementally larger coefficients are required. Additionally, the invention permits different numbers of multiply-accumulate instructions for each coefficient depending on the sensitivity to that particular coefficient.

24 Claims, 7 Drawing Sheets

OTHER PUBLICATIONS

SPARC Technology Business, *UltraSPARC Multimedia Capabilities On–Chip Support for Real–Time Video and Advanced Graphics,* Sun Microsystems (Sep. 1994).

Y. Kawakami et al., *LSI Applications: A Single–Chip Digital Signal Processor for Voiceband Applications,* Solid State Circuits Conference, Digest of Technical Papers; IEEE International (1980).

B. Case, *Philips Hopes to Displace DSPs with VLIW,* Microprocessor Report (Dec. 94), pp. 12–18.

N. Margulis, *i860 Microprocessor Architecture,* McGraw–Hill, Inc. (1990) Ch. 6, 7, 8, 10, 11.

*Pentium Processor User's Manual, vol. 3: Architecture and Programming Manual,* Intel Corporation (1993), Ch. 1, 3, 4, 6, 8, and 18.

METHOD AND APPARATUS FOR PROVIDING HIGH NUMERICAL ACCURACY WITH PACKED MULTIPLY-ADD OR MULTIPLY-SUBTRACT OPERATIONS

BACKGROUND OF THE INVENTION

1. Field of the Invention

The invention relates to microprocessor architecture and more specifically to multiply-accumulate operations.

2. Description of Related Art

Multiply-accumulate instructions are commonly used, for example, to implement transform coding and digital filters for audio, video, and modem applications.

Transforms

Transform coding is a method of converting sample data values, such as audio signals or video images, into a series of transform coefficients for more efficient transmission, computation, or other processing. The sample data values represent a signal as a function, for example, of time. The transform coefficients represent the same signal as a function, for example, of frequency. There are numerous transform algorithms, including, for example, the fast fourier transform (FFT), discrete cosine transform (DCT), and Z transform. Corresponding inverse transform algorithms, such as an inverse DCT, convert transform coefficients to sample data values. Many of these transform and inverse transform algorithms include the step of accumulating a series of products. A DCT, for example, includes the step of summing the products of sample data values and corresponding values determined from a sine or cosine function. The inverse DCT, for example, includes the step of summing the products of the transform coefficients and corresponding values determined from a sine or cosine function.

Digital Filters

Digital filters are used to provide a desired response to sample data values. Digital filters may be used in many applications including, for example, video and audio signal enhancement. There are numerous filter algorithms, including, for example, infinite impulse response (IIR) filters and finite impulse response (FIR) filters. Many digital filter algorithms require the accumulation of the products of filter coefficients and the sample data values to produce filtered data values. An IIR, for example, accumulates two series of products to produce filtered data values. Many digital filter coefficients are constants determined during the filter design process. Alternatively, adaptive filters use filter coefficients that may be modified while filtering, according to well-known methods.

Multiply-Accumulate

An instruction that multiplies two values and accumulates the product is commonly called a multiply-accumulate instruction. Since digital filters and transforms commonly accumulate a series of products, a multiply-accumulate instruction is useful. There are many variations of the multiply-accumulate instruction. For example, one multiply-accumulate instruction, as used in the Motorola DSP 56000 Digital Signal Processor, multiplies two scalar operands and adds the product to a third scalar operand to produce a scalar result. A multiply/add instruction, as used in the Hewlett-Packard PA-RISC Architecture, multiplies two scalar operands (represented below as M1 and M0) to produce one scalar result and adds two other scalar operands to produce another scalar result. Each of these scalar operands is retrieved from a floating point register as selected by a corresponding register address. A multiply-accumulate operation is performed, for example, if the multiply/add instruction produces a product in one cycle while the product produced by the previous multiply/add instruction is added to the accumulator. In the next cycle, the currently produced product can be added to the accumulator. Therefore, a second instruction is required to perform a multiply-accumulate operation.

The operands used in multiply-accumulate operations may be 16-bits wide. The result of multiplying two 16 bit operands to full precision is 32 bits wide. The operand containing the accumulated value is usually wider than 32-bits in order to avoid overflow when accumulating several 32-bit values. For example, the Motorola DSP561xx, a 16-bit architecture, uses 16-bit multiplicands and 36-bit accumulators, and the DSP56000, a 24-bit architecture, uses 24-bit multiplicands and 56-bit accumulators. These architectures are implemented, for example, in a digital signal processor (DSP).

Accuracy Requirements

Video transmission applications, for example, employ inverse transforms to process pixel data. A source device sends video information to a destination device. An inverse transform will ideally reproduce the pixel data when is performed on the transform data using infinite precision. However, infinite precision is not commercially feasible. With limited precision, the result of applying the inverse transform is only an approximation of the original pixel data. Accuracy is important for producing images that reasonably approximate the original pixel data. Some applications require greater accuracy. For example, standards such as Motion Picture Experts Group (MPEG) and H.261 reduce the amount of data to be transmitted but also tend to increase sensitivity to errors. MPEG and H.261 only send changed pixels to update each frame of video. Since each new computed frame is calculated based on the last computed frame for a sequence of a 100 or more frames, errors in the inverse transforms accumulates during each frame until the next whole frame is sent.

The increased error can cause the system to fail to meet the accuracy requirements of the IEEE Standard Specification for the Implementations of 8×8 Inverse Discrete Cosine Transforms, Mar. 18, 1991 (IEEE 1180). The IEEE 1180 standard requires, for example, that a system perform a series of transforms and inverse transforms on standard data set within a specified error limit. The error produced by the multiple iterations of transforms and inverse transforms is avoided by increasing the number of bits represented in the multiplicands. However, because the multiplicand size is defined by a particular architecture, increasing the number of bits represented can require that the hardware be changed. For example, a 16-bit DSP can be replaced by a 24-bit DSP, to increase the multiplicand size from 16-bits to 24-bits and achieve greater accuracy. A DSP with larger operands is more expensive than that with smaller operands because the DSP with larger operands typically employs, for example, larger multiplier arrays to produce the larger products and larger registers to store the operands and results. Although it may have been included in the system to perform the error-sensitive applications, other applications run on that system may not require the increased accuracy and therefore waste the increased capability.

SUMMARY OF THE INVENTION

A method and apparatus for improving the accuracy of multiply-accumulating by performing two multiply-add instructions to compute a result from multiplicands having more bits than can be processed by a single packed multiply-add instruction is described. A first result having a representation of value $A_0B_{0,LSB}+A_1B_{1,LSB}$ is computed by executing a packed multiply-add operation on a first packed data having representations of values $A_0$ and $A_1$ and said second packed data having representation of the least significant bits of values $B_0$ ($B_{0,LSB}$) and $B_1$ ($B_{1,LSB}$). A second result having a representation of value $A_0B_{0,MSB}+A_1B_{1,MSB}$ is computed by executing a packed multiply-add operation on the first packed data and a third packed data having representation of the most significant bits of values $B_0$ ($B_{0,MSB}$) and $B_1$ ($B_{1,MSB}$). A third result is computed by shifting to the right value $A_0B_{0,LSB}+A_1B_{1,LSB}$ in the first result. A final result having a representation of value $A_0B_0+A_1B_1$ is computed by executing an add operation on the second result and the third result.

DETAILED DESCRIPTION

In the following detailed description, numerous specific details are set forth in order to provide a thorough understanding of the described invention. Some of these specific details may not be required to practice the invention. In other instances, well-known structures, interfaces and processes have not been shown in detail in order to avoid obscuring the described invention.

Multimedia applications, such as digital filters and transforms, employ multiply-add instructions or equivalent operations to multiply sample data values by filter or transform values and accumulate the products to produce a result. These sample data values represent, for example, audio or video signals. Equivalent operations include, for example, separate multiply and add steps that, when taken together, perform the same function as a multiply-add instruction. The invention describes a method and apparatus for combining at least two packed multiply-add instructions to compute a result from coefficients having more bits than can be processed by a single packed multiply-add instruction or equivalent operation. This achieves greater accuracy without requiring more expensive hardware to implement. The invention is scaleable, permitting additional packed multiply-add instructions to be added as incrementally larger multiplicands are used.

Exemplary Computer System of the Invention

Figure 1:
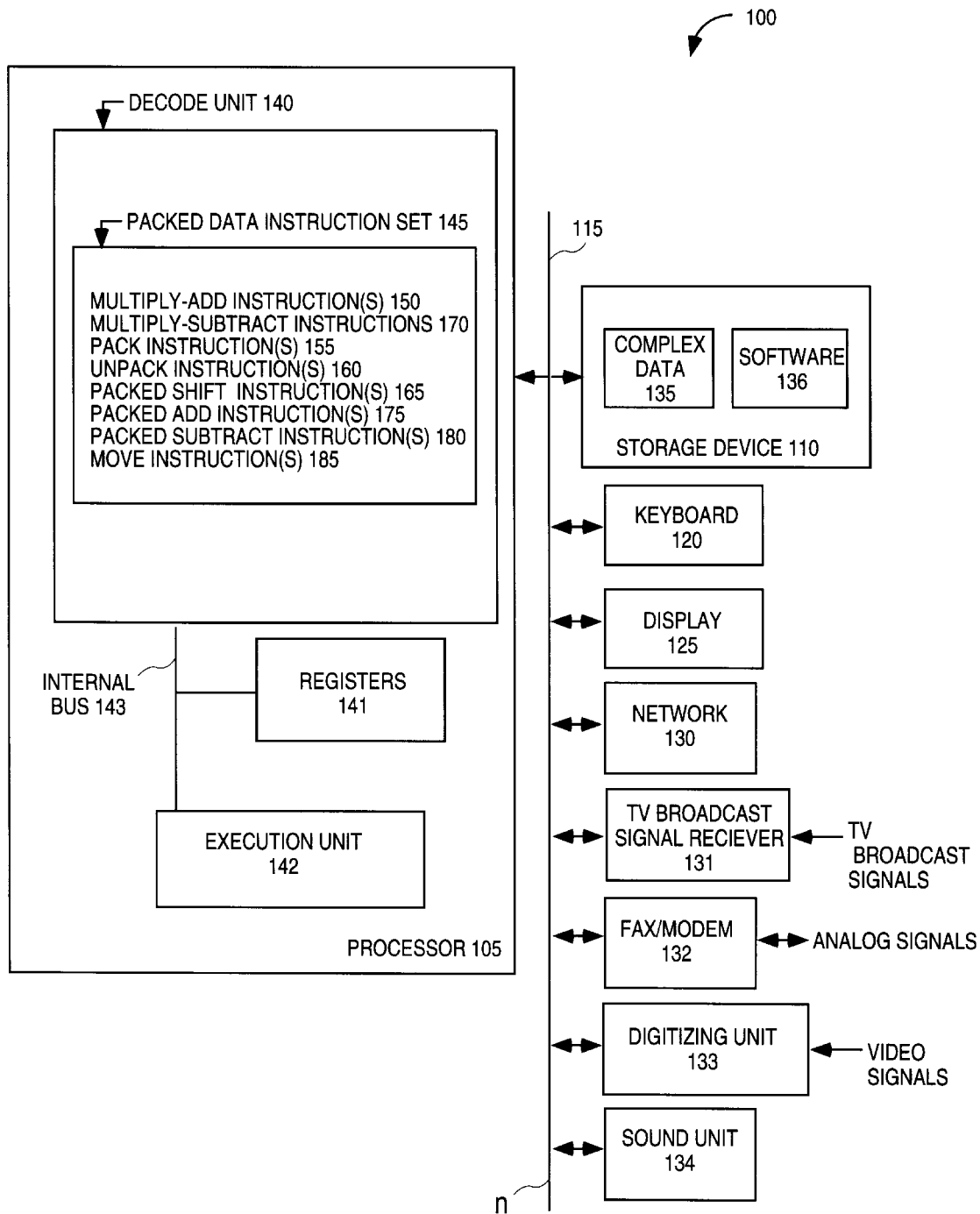
FIG. 1 illustrates a computer system in accordance with one embodiment of the invention.

FIG. 1 shows a block diagram illustrating an exemplary computer system 100 according to one embodiment of the invention. The exemplary computer system 100 includes a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as a CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more busses (e.g., PCI, ISA, X-Bus, EISA, VESA, etc.) and bridges (also known as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

Other devices, such as a network 130, a TV broadcast signal receiver 131, a fax/modem 132, a digitizing unit 133, and a sound unit 134 may optionally be coupled to bus 115. The network 130 represents one or more network connections (e.g., an ethernet connection). While the TV broadcast signal receiver 131 represents a device for receiving TV broadcast signals, the fax/modem 132 represents a fax and/or modem for receiving and/or transmitting analog signals representing data. As previously described, such signals often need to be filtered using a digital filter. The digitizing unit 133 represents one or more devices for digitizing images (e.g., a scanner, camera, etc.). The sound unit 134 represents one or more devices for inputting and/or outputting sound (e.g., microphones, speakers, magnetic storage devices, optical storage devices, etc.).

FIG. 1 also illustrates that the storage device 110 has stored therein complex data 135 and software 136. Complex data 135 represents data stored in one or more of the formats described herein. Software 136 represents the necessary code for performing any and/or all of the methods of the present invention. Of course, the storage device 110 preferably contains additional software (not shown), which is not necessary to understanding the invention.

FIG. 1 additionally illustrates that the processor 105 includes a decode unit 140, a set of registers 141, an execution unit 142, and an internal bus 143 for executing instructions. Of course, the processor 105 contains additional circuitry, which is not necessary to understanding the invention. The decode unit 140, registers 141 and execution unit 142 are coupled together by internal bus 143. The decode unit 140 is used for decoding instructions received by the processor 105 into control signals and/or microcode entry points. In response to these control signals and/or microcode entry points, the execution unit 142 performs the appropriate operations. The decode unit 140 may be implemented using any number of different mechanisms (e.g., a look-up table, a hardware implementation, a PLA, etc.).

While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including packed data instruction set 145 for performing operations on packed data. In one embodiment, the packed data instruction set 145 includes the following instructions: a packed multiply-add instruction(s) (PMADD) 150, a packed multiply-subtract instruction(s) (PMSUB) 170, a pack instruction(s) (PACK) 155, an unpack/interleave instruction(s) (PUNPCK) 160, a packed shift instruction(s) 165, a packed add instruction(s) (PADD) 175, a packed subtract instruction(s) (PSUB) 180, and a move instruction(s) 185. The operation of each of these instructions is further described herein. While these packed data instructions can be implemented to perform any number of different operations, in one embodiment these packed data instructions are those described in "A Set of Instructions for Operating on Packed Data," filed on Aug. 31, 1995, Ser. No. 08/521,360. Furthermore, in one embodiment, the processor 105 is a pipelined processor (e.g., the Pentium® processor available from Intel Corporation, Santa Clara, Calif.) capable of completing one or more of these packed data instructions per clock cycle (assuming there are no data dependencies and pipeline freezes). In addition to the packed data instructions, the processor 105 can include new instructions and/or instructions similar to or the same as those found in existing general purpose processors. For example, in one embodiment of the invention, the processor 105 supports the Pentium® microprocessor instruction set and the packed instruction set 145. By including the packed instruction set 145 into a standard microprocessor instruction set, such as the Pentium® microprocessor instruction set, packed data instructions can be easily incorporated into existing software (previously written for the standard microprocessor instruction set). Thus, many multimedia applications may be executed more efficiently by using the full width of a processor's data bus for performing operations on packed data. This eliminates the need to transfer smaller units of data across the processor's data bus to perform one or more operations one data element at a time. Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER, and MOTOROLA. Alpha™ is a trademark of Digital Equipment Corporation.) Alternative embodiments of the invention may contain more or less, as well as different, packed data instructions and still utilize the teachings of the invention.

Packed Data Formats of the Invention

In one embodiment of the invention, the execution unit 142 operates on data in several different packed (non-scalar) data formats. For example, in one embodiment, the computer system 100 manipulates 64-bit data groups and the packed data can be in one of three formats: a "packed byte" format, a "packed word" format, or a "packed double-word" (dword) format. Packed data in a packed byte format includes eight separate 8-bit data elements. Packed data in a packed word format includes four separate 16-bit data elements and packed data in a packed dword format includes two separate 32-bit data elements. Examples of particular operations are discussed below with reference to one packed data format. However, the operations apply similarly to any of the packed data formats of the invention.

Additionally, many of the instructions of the packed instruction set 145 can operate on signed or unsigned data and can be performed with or without "saturation". If an operation is performed using saturation, the value of the data element is clamped to a predetermined maximum or minimum value when the result of the operation exceeds the range of the data element. Exceeding the range of the data element is also referred to as data overflow or underflow. The use of saturation avoids the effects of data overflow or underflow. If the operation is performed without saturation, the data may be truncated or may indicate a data overflow or underflow in another manner.

In one embodiment, the opcodes of the instructions of the packed instruction set 145 are encoded differently depending on whether they operate on signed data or unsigned data. In another embodiment, certain instructions only operate on one type of data: either unsigned or signed.

Packed Data Instructions of the Invention

Referring now to FIGS. 2–6, one embodiment of the instructions of the packed instruction set 145 that is used to practice one embodiment of the method of the present invention is described in more detail. In each example described below, the first operand and the second operand are packed data elements. The first operand and the second operand can be read from the set of registers 141 or the storage device 110, for example. Reading is defined to include any data retrieval from a machine-readable storage medium or the direct output of a logic unit, such as the result of a previous computation. The result may be stored in the set of registers 141 or the storage device 110, for example. In one embodiment, the result is stored at the memory location from which either the first operand or the second operand was read. The following examples use packed word operations for illustration, but it will be apparent to one skilled in the art that other operand sizes, such as packed byte and packed doubleword, may be used.

Figure 2:
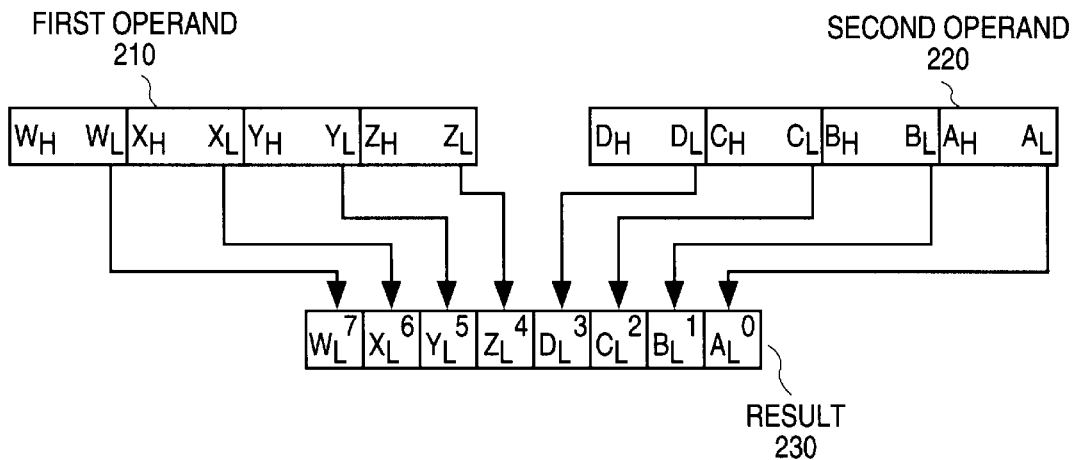
FIG. 2 illustrates one embodiment of the Pack operation.

FIG. 2 illustrates one embodiment of a Pack instruction 155. In this example, the Pack instruction converts data from packed words into packed bytes. The low-order byte of each packed word data element (the even numbered bytes) of a first operand 210 is packed into the high-order bytes of Result 230 as shown. The low-order byte of each packed word data element (the even numbered bytes) of a second operand 220 is packed into the low-order bytes of result 230 as shown. In an alternate embodiment, the high-order bytes of each data element (the odd-numbered bytes) of the first operand 210 and the second operand 220 are packed into result 230. Other pack instructions can convert, for example, scalar data elements to packed doublewords or packed doublewords to packed words.

Figure 3:
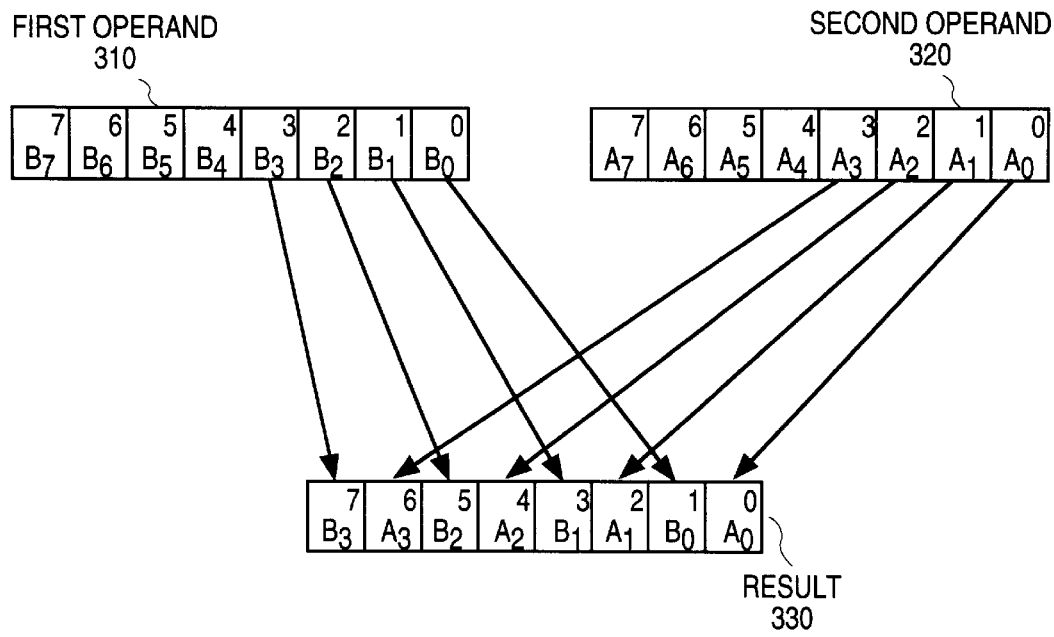
FIG. 3 illustrates one embodiment of the Unpack operation.

FIG. 3 illustrates one embodiment of an Unpack instruction 160. In one embodiment, the Unpack instruction performs an interleaved unpack the four low-order data elements of a first operand 310 and a second operand 320. Thus, data element 0 of the first operand 310 is stored in data element 0 of a result 330. Data element 0 of the second operand 320 is stored in data element 1 of the result 330. Data element 1 of the first operand 310 is stored in data element 2 of the result 330 and so forth, until all data elements of the result 330 store data from either the first operand 310 or the second operand 320. The high-order data elements of both the first operand 310 and the second operand 320 are ignored. By choosing either the first operand 310 or the second operand 320 to be all zeroes, the Unpack may be used to unpack packed byte data elements into packed word data elements or packed word data elements into packed dword data elements.

Figure 4:
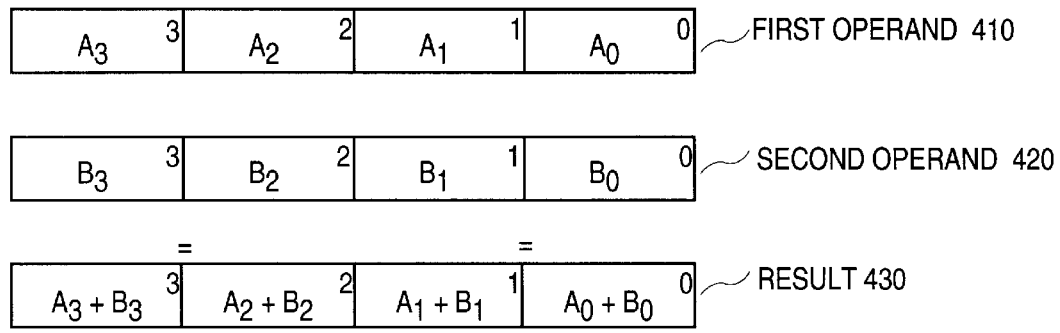
FIG. 4 illustrates one embodiment of a Packed Add operation.

FIG. 4 illustrates one embodiment a Packed Add instruction 175. Data element 0 of the first operand 410 is added to data element 0 of the second operand 420 to produce data element 0 of the result 430. Data element 1 of the first operand 410 is added to data element 1 of the second operand 420 to produce data element 1 of the result 430. Other data elements of the result 430 are computed in a similar manner. A Packed Subtract instruction is similar except that the elements of the second operand 420 are subtracted from the corresponding element of the first operand 410 to produce each element of the result 430.

Figure 5:
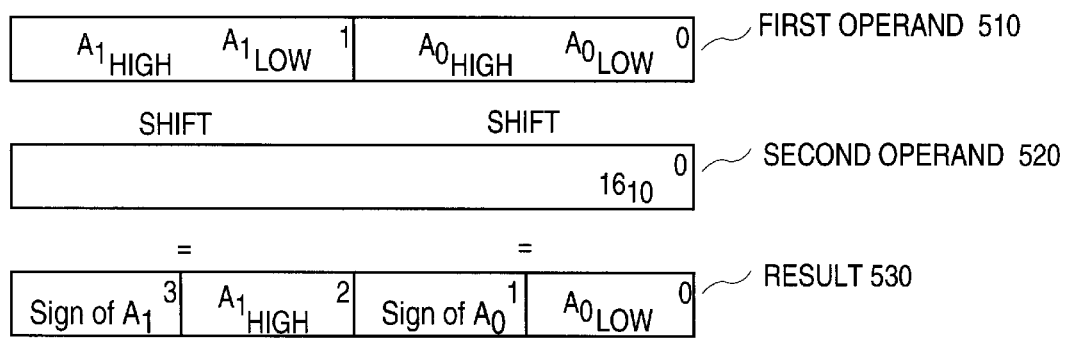
FIG. 5 illustrates one embodiment of a Packed Shift operation.

FIG. 5 illustrates one embodiment of the packed shift instruction 165. In one embodiment, a Packed Shift Right Arithmetic Word instruction right shifts the bits of each individual word element of a first operand 510 by a number of bits specified in a second operand 520. In another embodiment, a Packed Shift Left Arithmetic Word instruction shifts each word element of the first operand 510 to the left by a number of bits specified in a second operand 520. In one embodiment, the second operand 520 is an unsigned 64-bit scalar data element indicating the shift count. In alternate embodiments, an 8-bit scalar data element, for example, may be used to represent all possible shift values from 0 to 16 in each of the word elements of the first operand 510. In still another embodiment, the second operand 520 may comprise a packed data element with independent shift counts for each of the corresponding data elements of the first operand 510. In an right arithmetic shift, the high-order bits left open by the shift operation are filled with the initial value of the sign bit of the respective data element. In a right and left logical shift and the left arithmetic shift, the high or low-order bits (depending on the direction of the shift) of the data element are filled with zeroes.

Packed Multiply-Add/Packed Multiply-Subtract Instructions and Circuits

Figure 6A:
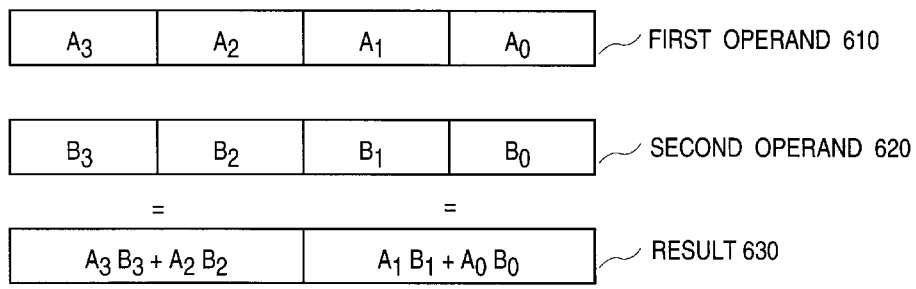
FIG. 6A illustrates one embodiment of a Packed Multiply-Add operation.

FIG. 6A illustrates one embodiment of a Packed Multiply-Add instruction 150. Each word element of a first operand 610 is multiplied by the corresponding data element of a second operand 620 to produce doubleword products that are summed by pairs to generate the two doubleword results that are packed into a result 630. As illustrated, the data elements of the result 630 are twice as wide as the data elements of the first operand 610 and the second operand 620. In one embodiment of the invention, the multiply-add instruction operates on signed packed data and truncates the results to avoid any overflows. However, alternative embodiments could support this instruction for other packed data types and rounding methods. Other embodiments of the Packed Multiply-Add instruction 150 may support other packed data types, such as those with different size elements or a different number of elements. The present invention may also be practiced using a sequence of instructions or operations that perform a similar function. For example, a packed multiply instruction and a packed add instruction can be used as an alternative to the packed multiply-add instruction.

Figure 6B:
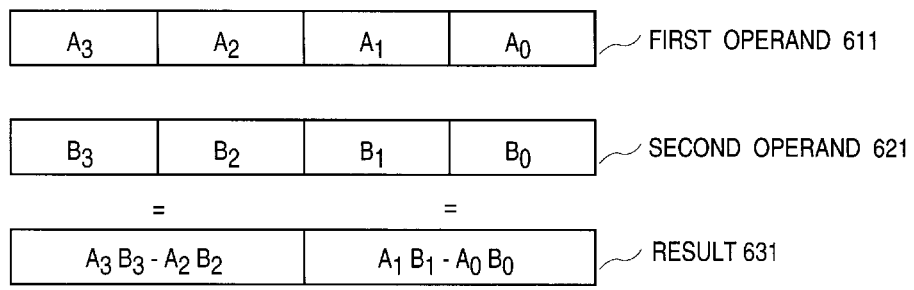
FIG. 6B illustrates one embodiment of a Packed Multiply-Subtract operation.

FIG. 6B illustrates one embodiment of a Packed Multiply-Subtract instruction 170. Each word element of a first operand 611 is multiplied by the corresponding data element of a second operand 621 to produce doubleword products. Differences between corresponding pairs of doubleword products are computed to generate the two doubleword results that are packed into a result 631. As illustrated, the data elements of the result 631 are twice as wide as the data elements of the first operand 611 and the second operand 621. In one embodiment of the invention, the multiply-subtract instruction operates on signed packed data and truncates the results to avoid any overflows. However, alternative embodiments could support this instruction for other packed data types and rounding methods. Other embodiments of the Packed Multiply-Subtract instruction 170 may support other packed data types, such as those with different size elements or a different number of elements. The present invention may also be practiced using a sequence of instructions or operations that perform a similar function. For example, a packed multiply instruction and a packed subtract instruction can be used as an alternative to the packed multiply-subtract instruction.

Figure 6C:
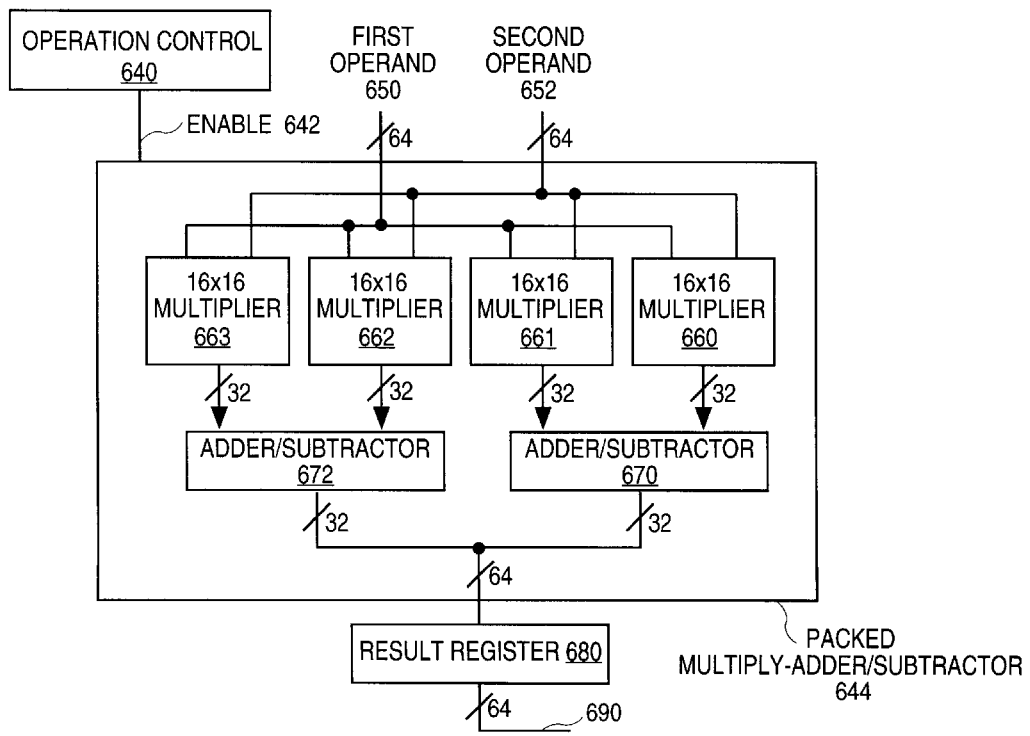
FIG. 6C illustrates one embodiment of a circuit capable of performing a multiply-add operation on individual data values of a packed data element.

FIG. 6C illustrates one embodiment of a circuit that performs a multiply-add operation. An operation control 640 controls the circuits performing the multiplication and outputs enable 642 to enable a packed multiply-adder/subtractor 644.

The packed multiply-adder/subtractor 644 simultaneously multiplies each of four word data elements of a first operand with four corresponding word data elements of a second operand to produce four doubleword intermediate results that are added pairwise to produce two doubleword data elements that are packed into a quadword packed result. The packed multiply-adder/subtractor 644 has the following inputs: a first operand 650, a second operand 652, and an enable 642.

The term "16×16" refers to the number of bits of each of the two operands multiplied in a particular multiplier. For example, a 16×16 multiplier multiplies an 16-bit operand with a 16-bit operand. The packed multiply-adder 644 includes four 16×16 multiplier circuits: a multiplier 660, a multiplier 661, a multiplier 662 and a multiplier 663. The multiplier 660 has as inputs bits zero to fifteen of the first operand 650 and bits zero to fifteen of the second operand 652. The multiplier 661 has as inputs bits sixteen to thirty-one of the first operand 650 and bits 16 to thirty-one of the second operand 652. The multiplier 662 has as inputs bits thirty-two to forty-seven of the first operand 650 and bits thirty-two to forty-seven of the second operand 652. The multiplier 663 has as inputs bits forty-eight to sixty-three of the first operand 650 and bits forty-eight to sixty-three of the second operand 652. The doubleword products generated by the multiplier 660 and the multiplier 661 are received by an adder/subtractor 670, while the doubleword products generated by the multiplier 662 and the multiplier 663 are received by an adder/subtractor 672.

The adder/subtractor 670 and the adder/subtractor 672 add their respective doubleword inputs. The output of the adder/subtractor 670 (i.e., result bits thirty-one through zero) and the output of the adder/subtractor 672 (i.e., result bits sixty-three through thirty-two) are packed into the quadword result and stored in a result register 680.

In one embodiment, a Packed Multiply-Subtract operation using the multiply-adder/subtractor 644 is performed like the Packed Multiply-Add except that the adder/subtractor 670 and the adder/subtractor 672 perform subtraction. For each adder/subtractor, one doubleword input is subtracted from the other to produce the output. These outputs are combined into a quadword result and stored to the result register 680.

Therefore, the packed multiply-add operation can operate on multiple data elements. To perform the equivalent of this multiply-add operation in prior art processors which operate on unpacked data, four separate 64-bit multiply operations and two 64-bit add operations could be used. However, the equivalent method on prior art processors wastes data lines and circuitry that are used for the bits that are higher than bit sixteen for the first operand and the second operand and higher than bit thirty two for the result. In addition, the entire quadword result generated by the prior art processor may not be of use to the programmer. Therefore, the programmer would have to truncate each result.

While one circuit implementation of the multiply-add instruction has been provided, alternative embodiments could implement this instruction in any number of ways. For example, alternative embodiments could use different sized multipliers (e.g., 8×16, 8×8) and include the additional adder circuitry to perform the necessary passes through the multipliers. As another example, alternative embodiments could include circuitry capable of doing only one multiply-add operation at a time. In such embodiments, the two multiply-add operations would have to be performed serially.

Figure 7:
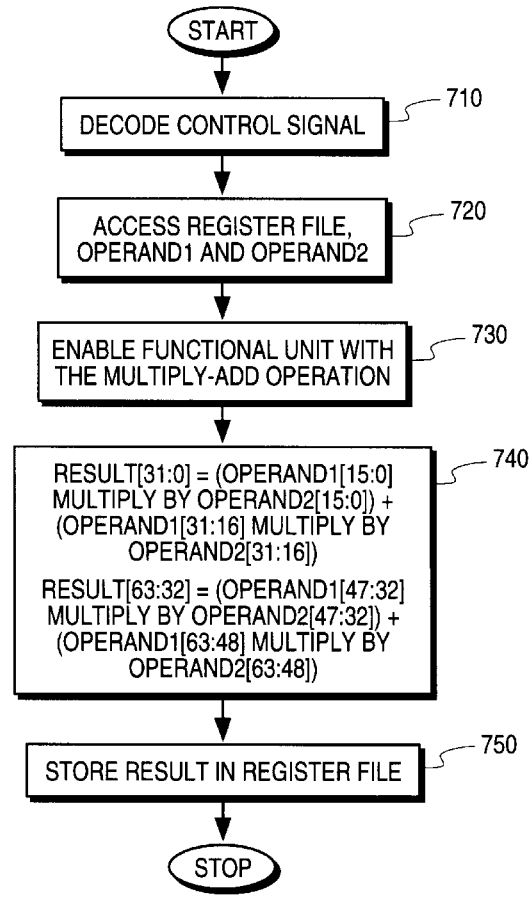
FIG. 7 illustrates one embodiment of a method performed by a microprocessor when performing a multiply-add operation on packed data.

FIG. 7 illustrates one embodiment of a method of performing a multiply-add operation on packed data. This embodiment can be implemented in the processor 105 of FIG. 1 using the packed multiply-add operation of FIG. 6A.

At step 710, the processor 105 decodes instructions received via said bus 115.

At step 720, via internal bus 143, the execution unit 130 accesses the register file 141 given the addresses to obtain packed data elements, the first operand 610 (operand 1) and the second operand 620 (operand2). The register file 141 provides the execution unit 142 with the packed data elements, the first operand and the second operand, via internal bus 143.

In step 730, the following is performed. Bits fifteen through zero of the first operand 610 are multiplied by bits fifteen through zero of the second operand 620 to generate a doubleword product. Bits thirty-one through sixteen of the first operand 610 are multiplied by bits thirty-one through sixteen of the second operand 620 to generate a doubleword product. Bits forty-seven through thirty-two of the first operand 610 are multiplied by bits forty-seven through thirty-two of the second operand 620 to generate a doubleword product. Bits sixty-three through forty-eight of the first operand 610 are multiplied by bits sixty-three through forty-eight of the second operand 620 to generate a doubleword product. The first two doubleword products are added together to generate bits thirty-one through 0 of the result 630, and the second two doubleword products are added together to generate bits sixty-three through thirty-two of result 630.

In one embodiment, the products are subtracted rather than added to produce result 630. In one embodiment, the multiply operations of step 730 are performed simultaneously using two or more multipliers. However, in another embodiment, these multiply operations are performed serially. In another embodiment the multiplies are performed simultaneously and subsequently the adds are performed simultaneously. In still another embodiment, some of these multiply operations are performed simultaneously and some are performed serially.

At step 740, the result 630 is stored in the one of the registers in the register file 141.

Two or More Packed Multiply-Add Instructions

Assuming a 64 bit packed data type, for example, two 32-bit multiply operations could be performed in parallel rather than four 16-bit multiply operations. If the packed data width were increased proportionally to maintain the number of data elements, the processor would require larger registers and wider busses to process these larger packed data types, thereby increasing processor cost. One embodiment of the invention performs two packed multiply-add instructions on packed data comprising N-bit elements to achieve the same accuracy as employing a single packed multiply-add instruction on packed data comprising 2N-bit elements. In the prior art example, a 32-bit (2N) processor was employed to improve the accuracy of the 16-bit (N) multiply-add computation. The invention uses two 16-bit (N) multiply-add operations to achieve the same results. This invention is fully scaleable for any value of N, such as 8, 16, 32, or 64.

Figure 8:
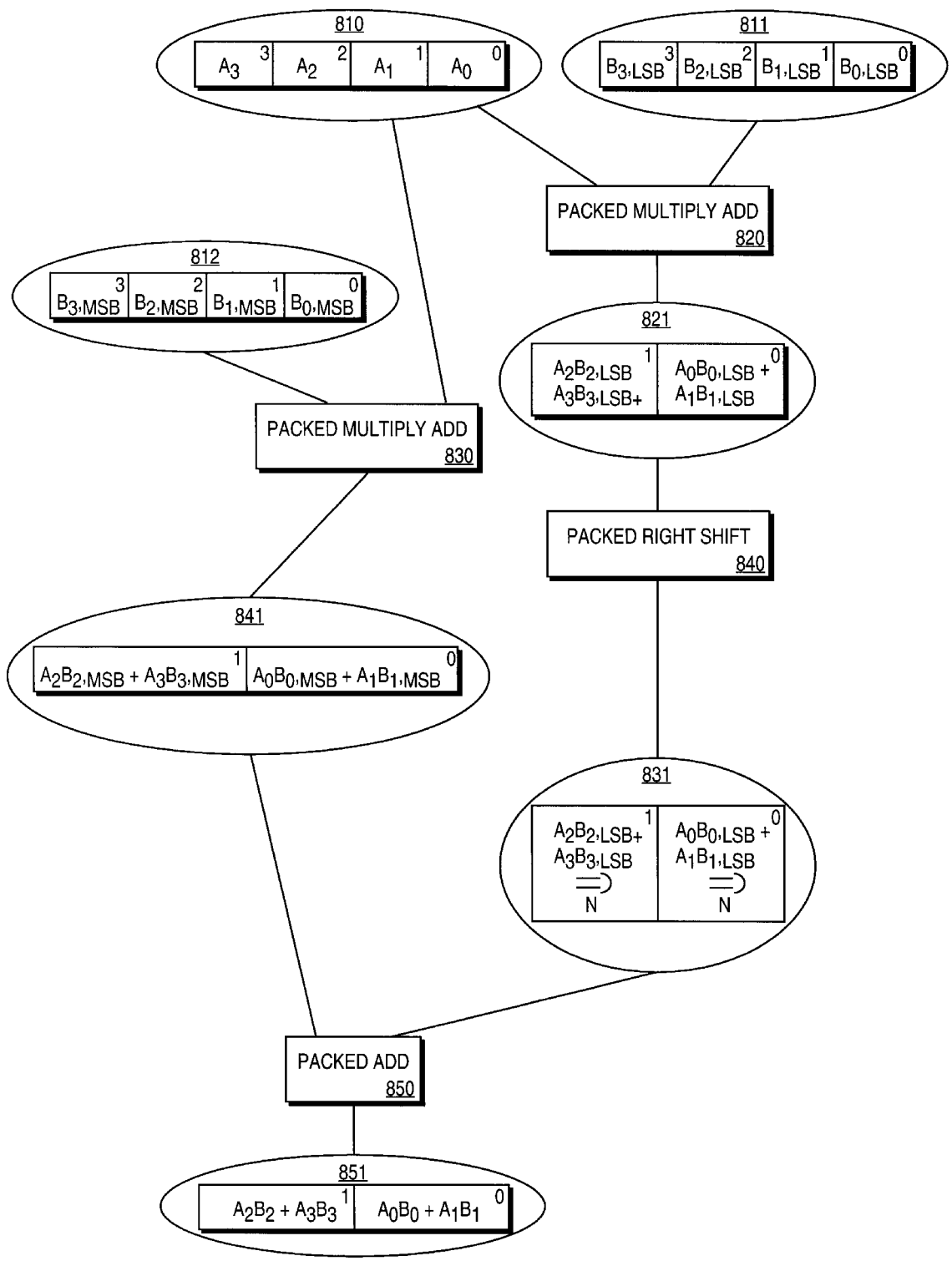
FIG. 8 illustrates one embodiment of a method for performing two multiply-add operations.

FIG. 8 illustrates the present invention to achieve improved accuracy in performing multiply-accumulate operations by combining at least two multiply-accumulate instructions to multiply coefficients having more bits than can be processed by a single multiply-accumulate instruction. In this application, data is represented by ovals, while instructions are represented by rectangles. A packed word data 810 contains four data words, $A_0$, $A_1$, $A_2$, and $A_3$, that represent data values to be multiplied by corresponding coefficients that may be larger than a word. Since the corresponding coefficients may be larger than a word, each coefficient is represented by two packed word data elements. A packed msb word data 812 contains the most significant bits and a packed lsb word data 811 contains the least significant bits of the coefficients. When the elements are represented by unsigned integers, a doubleword coefficient may be represented. A packed lsb word data 811 contains four data words, $B_{0,LSB}$, $B_{1,LSB}$, $B_{2,LSB}$, $B_{3,LSB}$, that represent the least significant word of the doubleword coefficients. A packed msb word data 812 contains four data words, $B_{0,MSB}$, $B_{1,MSB}$, $B_{2,MSB}$, $B_{3,MSB}$, that represent the most significant word of the doubleword coefficients. When the elements are represented by signed integers, two less bits of the coefficient may be represented. Each of the data words in packed word data 812 and packed word data 811 represent 15 bits of the coefficient. In another embodiment two data words are packed into each packed word data. It will be apparent to one skilled in the art that other numbers of data elements and other size data elements may be used.

In packed multiply-add step 820, a multiply-add instruction is performed on packed word data 810 and packed lsb word data 811 to produce packed doubleword data 821. The elements of packed doubleword data 821 are computed as if the least significant bits of the elements of packed lsb word data 811 had been shifted into the place of the most significant bits of the coefficient. This is done because the architecture typically cannot represent the least significant bits in their correct position. The shifted multiplicand produces a result that is left shifted by the number of bits of the most significant bits of packed msb word data 812. In an alternative embodiment, a packed multiply-subtract is performed rather than a packed multiply-add.

In packed multiply-add step 830, a multiply-add instruction is performed on packed word data 810 and packed msb word data 812 to produce packed doubleword data 821. In an alternative embodiment, a packed multiply-subtract is performed rather than a packed multiply-add.

In packed right arithmetic shift step 840, a packed doubleword data 831 is computed by right shifting the second result word data by the number of bits represented by the first portions (N) to compensate for the method of computation in step 820. The packed doubleword data 831 is appropriately represented to add or subtract to the packed doubleword data 821.

In packed add step 850, the packed doubleword data 841 and the packed doubleword data 831 are added to produce a packed doubleword data 851. In an alternative embodiment, a packed subtract is performed rather than a packed add.

Example of Improved Accuracy

An example of multiplying a single N-bit value by an 2N bit value using the method of the present invention is described below to illustrate the improved accuracy of the present invention. For the sake of simplicity and explanation, an example where N is 2 is described. A 4-bit multiply of the prior art will be contrasted with two 2-bit multiplies of the invention. In addition, the multiply of a single corresponding pair of data elements will be described. Note that the invention may be practiced with packed data types comprising multiple corresponding pairs of multiplicands.

Table 1 below shows two 4-bit values, $A_0$ and $B_0$, being multiplied as they would in a processor with a 4-bit multiply circuit and an 8-bit Result. In the present example, the bits represent a fraction, the first bit to the right of the decimal point representing ½, the second ¼, etc. The nth bit to the right of the decimal point representing $½^n$. Note, however, that the invention may be practiced with numerous numerical representation schemes. In the present example, the $A_0$ may represent a value from an audio or video signal, for example. As described previously, this value often does not require the extended precision of more bits and is limited by other factors, such as digital-to-analog converter precision. Here, $A_0$ only has two significant bits. On the other hand, it is often desirable to represent the coefficient, $B_0$, by a larger number of bits to achieve greater accuracy. Here, it is represented by three significant bits. The result of any N-bit by N-bit multiply requires at most 2N bits to represent without rounding or truncation. As shown in Table 1, eight bits (2N) are used to represent the result which has five significant digits.

TABLE 1

| .1100 | $A_0$ |
|---|---|
| × .0110 | $B_0$ |
| .01001000 | Result |

The invention performs the same computation using two 2-bit multiply operations. In the present example, $A_0$ is represented by the two significant bits of the data value in both operations. As mentioned previously, the number of bits representing this value does not need to be increased. On the other hand, the first operation uses the most-significant 2-bits of the coefficient, $B_0$, (represented as $B_{0,MSB}$) and the second operation uses the least significant 2-bits of the coefficient, $B_0$, (represented as $B_{0,LSB}$) In the first operation, a four bit intermediate result is produced as shown in Table 2.

TABLE 2

| .11 | $A_0$ |
|---|---|
| × .01 | $B_{0.MSB}$ |
| .0011 | Intermediate Result |

The second operation uses $A_0$ and the least significant two bits of the coefficient, $B_{0,LSB}$. The multiplication is performed with these least significant two bits of $B_{0,LSB}$ shifted to the left by two bits to move it into the most significant bit position since this multiplier processes the most significant two bits. In the second operation, a four bit intermediate result is produced as shown in Table 3.

TABLE 3

| .11 | $A_0$ |
|---|---|
| × .10 | $B_{0.LSB}$ |
| .0010 | Intermediate Result |

The intermediate result from the second multiplication is shifted to the right by 2 bits to produce a shifted intermediate result that compensates for having shifted $B_{0,LSB}$ the same number of bits to the left. The first intermediate result and the shifted second intermediate result can then be added to produce a result. The accuracy of this result depends on the number of bits in the intermediate result register, the number of bits in the result register and the rounding scheme.

For example, if a 6 bit (3N) intermediate result register and 6 bit (3N) result register is used, no rounding is necessary and the result is exactly the same as the 4-bit multiplier of the prior art as shown in Table 4. If a 4-bit (2N) result register is used, some accuracy is lost, but the result (0.0100) is still more accurate than a simple 2-bit (N) multiply (0.0011) as shown in Table 5.

TABLE 4

| .0011 | $A_0 \times B_{0.MSB}$ |
|---|---|
| + .000110 | Shifted $A_0 \times B_{0.LSB}$ |
| .010010 | Result |

TABLE 5

| .0011 | $A_0 \times B_{0.MSB}$ |
|---|---|
| + .000110 | Shifted $A_0 \times B_{0.LSB}$ |
| .0100 | Result |

A Video Transmission Application

Figure 9:
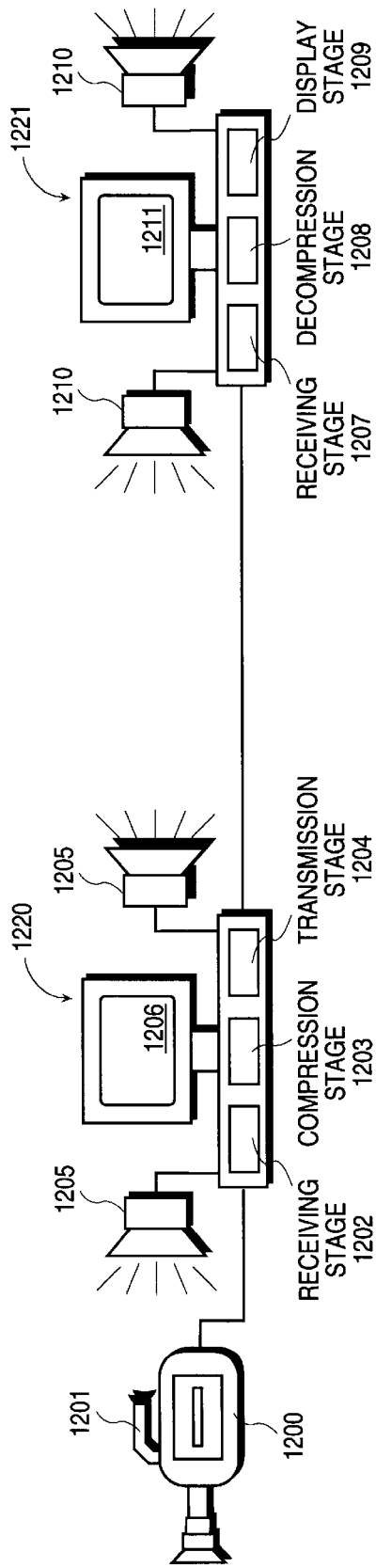
FIG. 9 illustrates one application of the present invention.

FIG. 9 illustrates one embodiment of a video transmission application of the present invention. A video device 900 is coupled to a first computer system 920. The first computer system 920 comprises a video display 906, speakers 905, a receiving stage 902, a compression stage 903, and a transmission stage 904. The receiving stage 902 is used to receive video information from the video device 900, for example. The receiving stage 902 is coupled to a compression stage 903 which is used to compress the information using transforms, compression algorithms, and motion estimation, for example, according to well-known methods and standards such as, for example, H.261 and Motion Picture Experts Group (MPEG). However, the transforms, compression algorithms, and any other accumulation of products may employ the method and apparatus of the present invention to compute the results with greater accuracy. The improved accuracy and performance of the method and apparatus of the present invention permits a general purpose processor, for example, rather than separate computational apparatus, such as a digital signal processor, to perform the computations. The compression stage is coupled to a transmission stage 904 that transmits the compressed information according to a second computer system 921 according to well-known methods.

The second computer system 921 comprises a video display 911, speakers 910, a receiving stage 907, a decompression stage 908, and a display stage 909. The receiving stage is coupled to the transmission stage 904 and is used to receive the transmitted compressed information from the first computer system 920 according to well-known methods. The decompression stage 908 is coupled to the receiving stage 907 to decompress the received compressed information according to well-known methods. However, the transforms, decompression algorithms, and any other accumulation of products may use the method and apparatus of the present invention to compute the results with greater accuracy thereby resulting in better fidelity in the recreated video image. The display stage 909 is coupled to the display device 911 to display the decompressed information. In some embodiments, the information also contains audio information which is sent to the speakers 910.

Similarly, the present invention may be used in other applications where improved accuracy is desirable.

Code Sequence Example

One embodiment of the present invention is a code sequence to perform a sum of two products, each produced by multiplying data with a corresponding extended precision data such as transform coefficient, for example. The following sequence is implemented for a word data and a doubleword extended data. It will be apparent to one skilled in the art that more products may be summed using this method and that other data sizes may be used for the data and extended data.

This sequence computes sum=$a_0 \times b_0 + a_1 \times b_1 + a_2 \times b_2 + a_3 \times b_3$, where $a_0$, $a_1$, $a_2$, and $a_3$ are word data elements and $b_0$, $b_1$, $b_2$, and $b_3$ are doubleword coefficients. The doubleword coefficients are each represented by two word portions, denoted by appending _LSB (least significant bits) and _MSB (most significant bits) to the variable name, to denote the 16 least significant bits and 16 most significant bits of each coefficient, respectively.

```
movq  r_0, ^a3—^a2—^a1—^a0           ;load packed data containing four words
movq  r_1, r_0                        ;copy packed data into a second register
pmaddd r_0, ^b3_LSBlsb—^b2_LSBlsb—^b1_LSBlsb—^b0_LSBlsb
compute LSB result
pmaddd r_1, ^b3_MSBmsb—^b2_MSBmsb—^b1_MSBmsb—^b0_MSBmsb
compute MSBmsb result
psrl  r_0, 15                         ;shift r0 to prepare LSBlsb to be added to MSB
paddd r_0, r_1                        ;finished 2 butterflies by adding LSBlsb and MSB
results
```

The movq (move quadword) instruction moves the respective 64 bit data element into a register. Here, the registers $r_0$ and $r_1$ are loaded with a packed data value comprising the four word data elements, $a_0$, $a_1$, $a_2$, and $a_3$, in the most significant to least significant words, respectively.

The packed multiply-add doubleword (pmaddd) performs the packed multiply add operation on the two word operands and stores the doubleword result in the first operand. The product of the least significant bits of $b_0$ ($b_{0\_LSB}$) and $a_0$ and the product of the least significant bits of $b_1$ ($b_{1\_LSB}$) and $a_1$ are added to produce rightmost packed doubleword of register $r_0$. The product of the least significant bits of $b_2$ ($b_{2\_LSB}$) and $a_2$ and the product of the least significant bits of $b_3$ ($b_{3\_LSB}$) and $a_3$ are added to produce the leftmost packed doubleword of register $r_0$.

The product of the most significant bits of $b_0$ ($b_{0\_MSB}$) and $a_0$ and the product of the most significant bits of $b_1$ ($b_{1\_MSB}$) and a1 are added to produce the rightmost packed doubleword of register $r_1$. The product of the most significant bits of $b_2$ ($b_{2\_MSB}$) and $a_2$ and the product of the most significant bits of $b_3$ ($b_{3\_MSB}$) and $a_3$ are added to produce the leftmost packed doubleword of register $r_1$.

The psrl (the packed shift right) instruction shifts each of the packed doublewords in the first operand to the right by the number of bits specified in the second operand and stores the result in the first operand. In order to adjust $r_0$ so that it can be added to $r_1$ to produce the final result, each doubleword in $r_0$ is shifted to the right by the number of significant digits that the least significant bits comprise. For unsigned integers, all the bits are used as significant digits such that $r_0$ should be shifted by 16 bits in the case of word data elements. For signed integers, one of the bits is used as a sign indicator such that $r_0$ should be shifted by 15 bits in the case of word data elements. Here, the packed doubleword is shifted by 15 bits. It will be apparent to one skilled in the art that other shift counts may be employed depending on, for example, the size of the data element and the size of the register in which the data element is stored.

The packed add doubleword (paddd) instruction adds the two doubleword operands and stores the packed results in the first operand. This produces results with extended accuracy.

Other Embodiments

Another embodiment of the invention may use three N-bit multiply instructions to multiply a 3N-bit coefficient. Other embodiments may use four, five, or more N-bit multiply instructions to multiply even larger coefficients. A skilled artisan would recognize that the multiply-add of the invention may be practiced for other operations that multiply operands, such as a simple multiply with packed or unpacked data elements. Other examples include a multiply-subtract operation in which the a subtraction is performed instead of an addition, and a multiply-accumulate operation in which the sum of products is added to an accumulated value.

What is claimed is:

1. In a computer system, a method of improving the accuracy of multiply-accumulating operations comprising the computer-implemented steps of:

reading a first packed data and a second packed data, said first packed data having representations of values $A_0$ and $A_1$ and said second packed data having representation of N least significant bits of values $B_0$ ($B_{0,LSB}$) and $B_1$ ($B_{1,LSB}$), wherein $B_{0,LSB}$ and $B_{1,LSB}$ are represented as unsigned integers;

generating a first result having a representation of value $A_0B_{0,LSB}+A_1B_{1,LSB}$;

reading said first packed data and a third packed data, said third packed data having representation of most significant bits of values $B_0$ ($B_{0,MSB}$) and $B_1$ ($B_{1,MSB}$);

generating a second result having a representation of value $A_0B_{0,MSB}+A_1B_{1,MSB}$;

generating a third result by right shifting the value $A_0B_{0,LSB}+A_1B_{1,LSB}$ in said first result by N bits;

reading said second result and said third result; and generating a final result having a representation of value $A_0B_0+A_1B_1$.

2. The method of claim 1 wherein the final result is a packed data.

3. In a computer system, a improving the accuracy of multiply-accumulating operations comprising the computer-implemented steps of:

reading a first packed data and a second packed data, said first packed data having representations of values $A_0$ and $A_1$ and said second packed data having representation of N least significant bits of values $B_0$ ($B_{0,LSB}$) and $B_1$ ($B_{1,LSB}$), wherein each of $B_{0,LSB}$ and $B_{1,LSB}$ are represented as signed integers;

generating a first result having a representation of value $A_0B_{0,LSB}+A_1B_{1,LSB}$;

reading said first packed data and a third packed data, said third packed data having representation of most significant bits of values $B_0$ ($B_{0,MSB}$) and $B_1$ ($B_{1,MSB}$);

generating a second result having a representation of value $A_0B_{0,MSB}+A_1B_{1,MSB}$;

generating a third result by right shifting said value $A_0B_{0,LSB}+A_1B_{1,LSB}$ in said first packed data result by less than N bits;

reading said second result and said third result; and generating a final result having a representation of value $A_0B_0+A_1B_1$.

4. The method of claim 3, wherein said final result is packed data.

5. A machine readable medium having stored thereon data representing a sequence of instructions, said sequence of instructions which, when executed by a processor, cause said processor to perform a method comprising the computer-implemented steps of:

reading a first packed data and a second packed data, said first packed data having representations of values $A_0$ and $A_1$ and said second packed data having representation of N least significant bits of values $B_0$ ($B_{0,LSB}$) and $B_1$ ($B_{1,LSB}$), wherein $B_{0,LSB}$ and $B_{1,LSB}$ are represented as unsigned integers;

generating a first result having a representation of value $A_0B_{0,LSB}+A_1B_{1,LSB}$;

reading said first packed data and a third packed data, said third packed data having representation of most significant bits of values $B_0$ ($B_{0,MSB}$) and $B_1$ ($B_{1,MSB}$);

generating a second result having a representation of value $A_0B_{0,MSB}+A_1B_{1,MSB}$;

generating a third result by right shifting the value $A_0B_{0,LSB}+A_1B_{1,LSB}$ in said first result by N bits;

reading said second result and said third result; and generating a final result having a representation of value $A_0B_0+A_1B_1$.

6. The machine-readable medium of claim 5 wherein the final result is a packed data.

7. A machine-readable medium having stored thereon data representing a sequence of instructions, said sequence of instructions which, when executed by a processor, cause said processor to perform a method comprising the computer-implemented steps of:

reading first packed data and a second packed data, said first packed data having representations of values $A_0$ and $A_1$ said second packed data having representation of N least significant bits of values $B_0$ ($B_{0,LSB}$) and $B_1$ ($B_{1,LSB}$), wherein each of $B_{0,LSB}$ and $B_{1,LSB}$ are represented as signed integers;

generating a first result having a representation of value $A_0B_{0,LSB}+A_1B_{1,LSB}$;

reading said first packed data an third packed data, said third packed data having representations of first significant bits of values $B_0$ ($B_{0,MSB}$) and $B_1$ ($B_{1,MSB}$);

generating a second result having a representation of value $A_0B_{0,MSB}+A_1B_{1,MSB}$;

generating a third result by right shifting said value $A_0B_{0,LSB}+A_1B_{1,LSB}$ in said first packed data result by less than N bits;

reading said second result and said third result; and generating a final result having a representation of value $A_0B_0+A_1B_1$.

8. The machine-readable medium of claim 7, wherein said final result is packed data.

9. In a computer system, a method of improving the accuracy of a multiply-accumulating operations comprising the computer-implemented steps of:

in response to a first instruction, performing the steps of:
reading a first packed data and a second packed data, said first packed data having representations of values $A_0$ and $A_1$ and said second packed data having representation of N least significant bits of values $B_0$ ($B_{0,LSB}$) and $B_1$ ($B_{1,LSB}$), wherein each of said $B_{0,LSB}$ value and said $B_{1,LSB}$ value are represented unsigned integers; and generating a first result having a representation of value $A_0B_{0,LSB}+A_1B_{1,LSB}$;

in response to a second instruction, performing the steps of:
reading said first packed data and a third packed data, said third packed data having representation of most significant bits of values $B_0$ ($B_{0,MSB}$) and $B_1$ ($B_{1,MSB}$); and generating a second result having a representation of value $A_0B_{0,MSB}+A_1B_{1,MSB}$;

in response to a third instruction, performing the steps of:
generating a third result by right shifting the value $A_0B_{0,LSB}+A_1B_{1,LSB}$ in said first result by N bits; and in response to a fourth instruction, performing the steps of:
reading said second result and said third result; and generating a final result having a representation of value $A_0B_0+A_1B_1$.

10. The method of claim 9 wherein the final result is a packed data.

11. In a computer system, a method of improving the accuracy of multiply-accumulating operations comprising the compute-implemented steps of:

in response to a first instruction, performing the steps of:
reading a first packed data and a second packed data, said first packed data having representations of values $A_0$ and $A_1$ and said second packed data having representation of N least significant bits of values $B_0$ ($B_{0,LSB}$) and $B_1$ ($B_{1,LSB}$), wherein each of said $B_{0,LSB}$ value and said $B_{1,LSB}$ value are represented as signed integers comprising N bits; and generating a first result having a presentation of value $A_0B_{0,LSB}+A_1B_{1,LSB}$;

in response to a second instruction, performing the steps of:
reading said first packed data and a third packed data, said third packed data having representation of most significant bits of values $B_0$ ($B_{0,MSB}$) and $B_1$ ($B_{1,MSB}$); and generating a second result having a representation of value $A_0B_{0,MSB}+A_1B_{1,MSB}$;

in response to a third instruction, performing the steps of:
generating a third packed data result by right shifting the said value $A_0B_{0,LSB}+A_1B_{1,LSB}$ in said first packed data result by less than N bits; and in responce to a fourth instruction, performing the steps of:
reading said second result and said third result; and generating a final result having a representation of value $A_0B_0+A_1B_1$.

12. The method of claim 11, wherein said final result is packed data.

13. A machine readable medium having stored thereon data representing a sequence of instructions, said sequence of instructions which, when executed by a processor, cause said processor to perform a method comprising the computer-implemented steps of;
  in response to a first instruction, performing the steps of:
    reading a first packed data and a second packed data, said first packed data having representations of values $A_0$ and $A_1$ and said second packed data having representation of N least significant bits of values $B_0$ ($B_{0,LSB}$) and $B_1$ ($B_{1,LSB}$), wherein each of said $B_{0,LSB}$ value and said $B_{1,LSB}$ value are represented as unsigned integers; and
    generating a first result having a representation of value $A_0B_{0,LSB}+A_1B_{1,LSB}$;
  in response to a second instruction, performing the steps of:
    reading said first packed data and a third packed data, said third packed data having representation of most significant bits of values $B_0$ ($B_{0,MSB}$) and $B_1$ ($B_{1,MSB}$); and
    generating a second result having a representation of value $A_0B_{0,MSB}+A_1B_{1,MSB}$;
  in response to a third instruction, performing the steps of:
    generating a third result by right shifting the value $A_0B_{0,LSB}+A_1B_{1,LSB}$ in said first result by N bits; and
  in response to a fourth instruction, performing the steps of:
    reading said second result and said third result; and
    generating a final result having a representation of value $A_0B_0+A_1B_1$.

14. The machine-readable medium of claim 13 wherein the final result is a packed data.

15. A machine-readable medium having stored thereon data representing a sequence of instructions, said sequence of instructions which, when executed by a processor, cause said processor to perform a method comprising the computer-implemented steps of:
  in response to a first instruction, performing the steps of:
    reading first packed data and a second packed data, said first packed data having representation of values $A_0$ and $A_1$ and said second packed data having representation of N least significant bits of values $B_0$ ($B_{0,LSB}$) and $B_1$ ($B_{1,LSB}$), wherein each of said $B_{0,LSB}$ value and said $B_{1,LSB}$ value are represented as signed integers comprising N bits; and
    generating a first result having a representation of value $A_0B_{0,LSB}+A_1B_{1,LSB}$;
  in response to a second instruction, performing the steps of:
    reading said first packed data and a third packed data, said third packed data having representation of most significant bits of values $B_0$ ($B_{0,MSB}$) and $B_1$ ($B_{1,MSB}$); and
    generating a second result having a representation of value $A_0B_{0,MSB}+A_1B_{1,MSB}$;
  in response to a third instruction, performing the steps of:
    generating a third packed data result by right shifting the said value $A_0B_{0,LSB}+A_1B_{1,LSB}$ in said first packed data result by less than N bits; and
  in response to a fourth instruction, performing the steps of:
    reading said second result and said third result; and
    generating a final result having a representation of value $A_0B_0+A_1B_1$.

16. The machine-readable medium of claim 15, wherein said final result is packed data.

17. In a computer system, a method of improving the accuracy of multiply-accumulating operations comprising the computer-implemented steps of:
  in response to a first instruction, performing the steps of:
    reading a first packed data and a second packed data, said first packed data having representations of values $A_0$, $A_1$, $A_2$, and $A_3$ and said second packed data having representation of N least significant bits of values $B_0$ ($B_{0,LSB}$), $B_1$ ($B_{1,LSB}$), $B_2$ ($B_{2,LSB}$), and $B_3$ ($B_{3,LSB}$), wherein each of said least significant bit values $B_{0,LSB}$, $B_{1,LSB}$, $B_{2,LSB}$ and $B_{3,LSB}$ are represented as unsigned integers; and
    generating a first packed data result having representations, of values $A_0B_{0,LSB}+A_1B_{1,LSB}$ and $A_2B_{2,LSB}+A_3B_{3,LSB}$;
  in response to a second instruction, performing the steps of:
    reading said first packed data and a third packed data, said third packed data having representation of most significant bit values $B_0$ ($B_{0,MSB}$), $B_1$ ($B_{1,MSB}$), $B_2$ ($B_{2,MSB}$), and $B_3$ ($B_{3,MSB}$); and
    generating a second packed data result having representations of values $A_0B_{0,MSB}+A_1B_{1,MSB}$ and $A_2B_{2,MSB}+A_3B_{3,MSB}$;
  in response to a third instruction generating a third packed data result by right shifting each value in said first packed data result by N bits; and
  in response to a fourth instruction:
    reading said second packed data result and said third packed data result; and
    generating a final packed data result having representations of values $A_0B_0+A_1B_1$ and $A_2B_2+A_3B_3$.

18. In a computer system, a method of improving the accuracy of multiply-accumulating operations comprising the computer-implemented steps of:
  in response to a first instruction, performing the steps of:
    reading a first packed data and a second packed data, said first packed data having representations of values $A_0$, $A_1$, $A_2$, and $A_3$ said second packed data having representation of N least significant bits of values $B_0$ ($B_{0,LSB}$), $B_1$ ($B_{1,LSB}$), $B_2$ ($B_{2,LSB}$), and $B_3$ ($B_{3,LSB}$), wherein each of said least significant bit values $B_{0,LSB}$, $B_{1,LSB}$, $B_{2,LSB}$, and $B_{3,LSB}$ are represented as signed integers; and
    generating a first packed data result having representations of values $A_0B_{0,LSB}+A_1B_{1,LSB}$ and $A_2B_{2,LSB}+A_3B_{3,LSB}$;
  in response to a second instruction, performing the steps of:
    reading said first packed data and a third packed data, said third packed data having representation of most significant bit values $B_0$ ($B_{0,MSB}$), $B_1$ ($B_{1,MSB}$), $B_2$ ($B_{2,MSB}$), and $B_3$ ($B_{3,MSB}$); and
    generating a second packed data result having representations of values $A_0B_{0,MSB}+A_1B_{1,MSB}$ and $A_2B_{2,MSB}+A_3B_{3,MSB}$;
  in response to a third instruction generating a third packed data result by right shifting each value in said first packed data result by less than N bits; and
  in response to a fourth instruction:
    reading said second packed data result and said third packed data result; and
    generating a final packed data result having representations of values $A_0B_0+A_1B_1$ and $A_2B_2+A_3B_3$.

19. A machine readable medium having stored thereon data representing a sequence of instructions, said sequence of instructions which, when executed by a processor, cause said processor to perform a method comprising the computer-implemented steps of:

in response to a first instruction, performing the steps of:

reading a first packed data and a second packed data, said first packed data having representations of values $A_0$, $A_1$, $A_2$, and $A_3$ and said second packed data having representation of N least significant bits of values $B_0$ ($B_{0,LSB}$), $B_1$ ($B_{1,LSB}$), $B_2$ ($B_{2,LSB}$), and $B_3$ ($B_{3,LSB}$), wherein each of said least significant bit values $B_{0,LSB}$, $B_{1,LSB}$, $B_{2,LSB}$ and $B_{3,LSB}$ are represented as unsigned integers; and generating a first packed data result having representations of values $A_0B_{0,LSB}+A_1B_{1,LSB}$ and $A_2B_{2,LSB}+A_3B_{3,LSB}$;

in response to a second instruction, performing the steps of;

reading said first packed data and a third packed data, said third packed data having representation of most significant bit values $B_0$ ($B_{0,MSB}$), $B_1$ ($B_{1,MSB}$), $B_2$ ($B_{2,MSB}$), and $B_3$ ($B_{3,MSB}$); and generating a second packed data result having representations of values $A_0B_{0,MSB}+A_1B_{1,MSB}$ and $A_2B_{2,MSB}+A_3B_{3,MSB}$;

in response to a third instruction generating a third packed data result by right shifting each value in said first packed data result by N bits; and in response to a fourth instruction:

reading said second packed data result and said third packed data result; and generating a final packed data result having representations of values $A_0B_0+A_1B_1$ and $A_2B_2+A_3B_3$.

20. A machine readable medium having stored thereon data representing a sequence of instructions, said sequence of instructions which, when executed by a processor, cause said processor to perform a method comprising the computer-implemented steps of:

in response to a first instruction, performing the steps of:

reading a first packed data and a second packed data, said first packed data having representations of values $A_0$, $A_1$, $A_2$, and $A_3$ and said second packed data having representation of N least significant bits of value $B_0$ ($B_{0,LSB}$), $B_1$ ($B_{1,LSB}$), $B_2$ ($B_{2,LSB}$), and $B_3$ ($B_{3,LSB}$), wherein each of said least significant bit values $B_{0,LSB}$, $B_{1,LSB}$, $B_{2,LSB}$, and $B_{3,LSB}$ are represented as signed integers; and generating first packed data result having representations of values $A_0B_{0,LSB}+A_1B_{1,LSB}$ and $A_2B_{2,LSB}+A_3B_{3,LSB}$;

in response to a second instruction, performing the steps of:

reading said first packed data and a third packed data, said third packed data having representation of most significant bit values $B_0$ ($B_{0,MSB}$), $B_1$ ($B_{1,MSB}$), $B_2$ ($B_{2,MSB}$), and $B_3$ ($B_{3,MSB}$); and generating a second packed data result having representations of values $A_0B_{0,MSB}+A_1B_{1,MSB}$ and $A_2B_{2,MSB}+A_3B_{3,MSB}$;

in response to a third instruction generating a third packed data result by right shifting each value in said first packed data result by less than N bits; and in response to a fourth instruction:

reading said second packed data result and said third packed data result; and generating a final packed data result having representations of values $A_0B_0+A_1B_1$ and $A_2B_2+A_3B_3$.

21. In a computer system, a method of improving the accuracy of multiply-accumulating operation comprising the computer-implemented steps of:

reading a first packed data and a second packed data, said first packed data having representations of values $A_0$ and $A_1$ and said second packed, data having representations of N least significant bits of values $B_0$ ($B_{0,LSB}$) and $B_1$ ($B_{1,LSB}$), wherein each of said least significant bits are represented as unsigned integers; and generating a first result having a representation of value $A_0B_{0,LSB}-A_1B_{1,LSB}$;

reading said first packed data and a third packed data, said third packed data having representation of most significant bits of values $B_0$ ($B_{0,MSB}$) and $B_1$ ($B_{1,MSB}$);

generating a second result having a representation of value $A_0B_{0,MSB}-A_1B_{1,MSB}$;

generating a third result by right shifting said value $A_0B_{0,LSB}-A_1B_{1,LSB}$ in said first result by N bits;

reading said second result and said third result; and generating a final result having a representation of value $A_0B_0-A_1B_1$.

22. The method of claim 21 wherein the final result is a packed data.

23. In a computer system a method of improving the accuracy of multiply-accumulating operations comprising the computer-implemented steps of:

reading a first packed data and a second packed data, said first packed data having representations of values $A_0$ and $A_1$ and said second packed data having representations of N least significant bits of values $B_0$ ($B_{0,LSB}$) and $B_1$ ($B_{1,LSB}$), wherein each of said values $B_{0,LSB}$ and $B_{1,LSB}$ are represented a signed integers; and generating a first result having a representation of value $A_0B_{0,LSB}-A_1B_{1,LSB}$;

reading said first packed data and a third packed data, said third packed data having representation of most significant bits of values $B_0$ ($B_{0,MSB}$) and $B_1$ ($B_{1,MSB}$);

generating a second result having a representation of value $A_0B_{0,MSB}-A_1B_{1,MSB}$;

generating a third result by right shifting the value $A_0B_{0,LSB}-A_1B_{1,LSB}$ in said first result by less than N bits;

reading said second result and said third result; and generating a final result having a representation of value $A_0B_0-A_1B_1$.

24. The method of claim 23, wherein said final result is packed data.

\* \* \* \* \*

UNITED STATES PATENT AND TRADEMARK OFFICE
CERTIFICATE OF CORRECTION

PATENT NO.    : 5,862,067
DATED         : January 19, 1999
INVENTOR(S)   : Mennemeier et al.

It is certified that error appears in the above-identified patent and that said Letters Patent is hereby corrected as shown below:

<u>Column 16,</u>
Line 40, delete "compute" and insert -- computer --.
Line 63, delete "responce" and insert -- response --.

<u>Column 20,</u>
Line 10, delete "operation" and insert -- operations --.

Signed and Sealed this

Second Day of September, 2003

JAMES E. ROGAN
*Director of the United States Patent and Trademark Office*